(12) United States Patent
Jian

(10) Patent No.: US 6,656,857 B1
(45) Date of Patent: Dec. 2, 2003

(54) INTEGRAL COMPOSITE WAX-POLYMER MEMBRANES

(75) Inventor: Kangzhuang Jian, Allen, TX (US)

(73) Assignee: Natural Polymer International Corporation, Plano, TX (US)

( * ) Notice: Subject to any disclaimer, the term of this patent is extended or adjusted under 35 U.S.C. 154(b) by 0 days.

(21) Appl. No.: 09/260,573

(22) Filed: Mar. 1, 1999

(51) Int. Cl.$^7$ .............................................. B32B 5/22

(52) U.S. Cl. .................... 442/76; 442/86; 442/90; 442/153; 442/159; 442/327; 442/394; 428/411.1; 428/484; 428/485; 428/486; 427/243; 427/245; 524/31; 524/35; 524/41; 524/487; 524/565; 524/571; 524/577; 524/609

(58) Field of Search .................... 442/76, 77, 86, 442/90, 327, 153, 159, 394; 428/484, 485, 486, 411.1; 427/243, 245; 524/31, 35, 41, 487, 565, 571, 577, 609

(56) References Cited

U.S. PATENT DOCUMENTS

| | | | |
|---|---|---|---|
| 3,644,254 A | 2/1972 | Dew ......................... | 260/28.5 |
| 4,661,359 A | 4/1987 | Seaborne et al. ............. | 426/89 |
| 4,915,971 A | 4/1990 | Fennema et al. ........... | 426/578 |
| 4,990,378 A | 2/1991 | Jones ......................... | 427/420 |
| 5,096,468 A | 3/1992 | Minhas .......................... | 55/16 |
| 5,190,997 A * | 3/1993 | Lindemann et al. .......... | 524/44 |
| 5,662,731 A * | 9/1997 | Andersen et al. ......... | 106/206.1 |
| 5,688,855 A * | 11/1997 | Stoy et al. .................. | 524/505 |

OTHER PUBLICATIONS

I. Porter and C. Mark, "Handbook of Industrial Membrane Technology, Chapter 1 Synthetic Membranes and Their Preparation," 1990 Noyes Publications, pp. 1–56.

Richard Baker, "Controlled Release of Biologically Active Agents –Chapter 1 Introduction," 1987 John Wiley & Sons, Inc., pp. 1–18.

Myrna O. Nisperos–Carriedo, Philip E. Shaw and E. A. Baldwin, "Changes in Volatile Flavor Components of Pineapple Orange Juice as Influenced by the Application of Lipid and Composite Films," J. Agric. Food Chem. 1990, 38, pp. 1382–1387.

I.K. Greener and O. Fennema, "Evaluation of Edible, Bilayer Films for Use as Moisture Barriers for Food," Journal of Food Science, vol. 54, No. 6, 1989, pp. 1400–1406.

J. J. Kester and O. Fennema, "An Edible Film of Lipids and Cellulose Ethers: Performance in a Model Frozen–Food System," Journal of Food Science, vol. 54, No. 6, 1989, pp. 1390–1406.

J.J. Kester and O. Fennema, "An Edible Film of Lipids and Cellulose Ethers: Barrier Properties to Moisture Vapor Transmission and Structural Evaluation," vol. 54, No. 6, 1999 Journal of Food Science, pp. 1383–1389.

J. David Bower, "Coatings Technology Handbook—Chapter 53—Waxes," 1991 Marcel Dekker, Inc., pp. 477–483.

I.K. Greener and O. Fennema, "Barrier Properties and Surface Characteristics of Edible, Bilayer Films," Vol. 54, No. 6, 1989 Journal of Food Science, pp. 1393–1399.

(List continued on next page.)

*Primary Examiner*—Ula Ruddock
(74) *Attorney, Agent, or Firm*—Jackson Walker L.L.P.

(57) ABSTRACT

A composite barrier membrane coated on a substrate and membrane is formed by phase inversion technique utilizing a water-insoluble wax and a water-insoluble polymer dissolved in a solvent. The barrier membrane coated upon the substrate is used to control transmembrane transport of a liquid and a gas. The substrate can be a starch based food package material, a protein based food package materials, a natural fabric, a synthetic fabric, or a paper product.

12 Claims, 3 Drawing Sheets

OTHER PUBLICATIONS

Robert D. Hagenmaier and Philip E. Shaw, "Moisture Permeability of Edible Films Made with Fatty Acid and (Hydroxypropyl) Methylcellulose," J. Agric. Food Chem. 1990, 38, 99. 1799–1803.

J.J. Kester and O. Fennema, "Resistance of Lipid Films to Oxygen Transmission," Journal of American Oil Chemical Society, vol. 66, No. 8, Aug. 1989, pp. 1129–1138.

J.J. Kester and O. Fennema, "Resistance of Lipid Films to Water Vapor Transmission," Journal of American Oil Chemical Society, vol. 66, No. 8, Aug. 1989, pp. 1139–1146.

Robert D. Hagenmaier and Philip E. Shaw, "Permeablility of Shellac Coatings to Gases and Water Vapor," Journal of Agricultural and Food Chemistry, vol. 39, No. 5, May 1991, pp. 825–829.

* cited by examiner

INTEGRAL COMPOSITE WAX-POLYMER MEMBRANES

BACKGROUND

The present invention relates to a composite barrier membrane coated on a substrate or device and the membrane is formed by phase inversion technique utilizing a water-insoluble wax and a water-insoluble polymer dissolved in a solvent. The barrier membrane coated upon a substrate is used to control transmembrane transport of a liquid, such as water, and a gas, such as oxygen and nitrogen.

Barrier membranes are used to control transfer, by diffusion or sorption, of substances in a gas or liquid phase from a region of higher concentration to one of lower concentration, where concentration means mass of substance contained in a unit volume. The dialysis process is a familiar example in which movement of a solute is restricted by a semipermeable membrane such that low molecular weight material passing the membrane is separated from a mixture of low and high molecular weight material where the membrane is impermeable to the latter. The rate of transfer of a substance across a membrane with time depends upon differential concentration across the barrier and upon permeability properties of the membrane itself Thus, variability in membrane intrinsic properties controls transmembrane transfer rates. For a substance Q and a particular membrane the coefficient of diffusion ($\Delta$) is defined by the equation:

$$\frac{dQ}{dt} = -\Delta\left(\frac{dc}{dx}\right) dy dx$$

where dQ is an amount of Q passing through a membrane in the direction of x in time dt, membrane area is dydx and dc/dx is the rate of increase of concentration of Q in the direction of x. For transfer of water in the gas phase or water vapor across a membrane dc/dx is proportional to partial pressure of water in the gas phase or to concentration. It is an objective of this invention to control membrane composition and permeability characteristics expressed in $\Delta$ such that transfer of water and gasses across the membrane is predictably controlled.

Hagenmaier and Shaw (Hagenmaler, R D, and Shaw, P E, "Moisture Permeability of Edible Films Made with Fatty Acid and (Hydroxypropyl) Methylcellulose," *J. Agric. Food Chem.*, 1990, 38, 1799–1803) prepared a film or membrane by evaporation cast from (hydroxypropyl) methyl cellulose in 95% ethanol solution containing 0 to 65% $C_{12}$ to $C_{18}$ fatty acids (1). The barrier membranes were designed to be edible and to serve as a device for controlling moisture transfer in food packaging. The article reported a study of transmembrane transfer of water vapor or permeability and found this parameter to be strongly dependent upon both the concentration of fatty acid dissolved in the solution used to fabricate membranes and the carbon chain length of the chosen fatty acid. Stearic acid most efficiently reduced water transfer when its concentration was increased to about 45% by weight in parent methylcellulose-fatty acid ethanol solution. Membranes composed of hydrophilic polymers prepared by this method possessed a major disadvantage in that water vapor permeability was greatly increased at values of relative humidity above 94%.

Moisture content greatly influences shelf life of many foods and thus food science research laboratories have taken a leading role in development of methods for forming polymer membranes which incorporate hydrophobic materials to confer resistance to water transfer where this property is useful to preserve flavor or texture. In U.S. Pat. No. 4,915,971 to Fennema, Kamper and Kester, an edible film prepared from hydrophilic polymer and fatty acid laminated with an additional layer of beeswax were used, for example, to separate a watery pizza sauce component from surrounding bread component to prevent sogginess during storage. The patent describes the preparation of an edible film by first dissolving hydrophilic polymers such as starch, albumin or cellulose methyl and hydroxypropyl ethers in water solution, adding ethanol and a blend of stearic and palmitic acids at 65° C. and plating the resulting solution onto glass for drying at 100° C. An additional lipid layer was added in the following step by pouring on a thin coating of molten beeswax at 180° C. or by adding the beeswax from an ethanol solution. After careful removal from the glass support, this membrane was useful as a water transfer barrier for hydrophilic pizza sauce during storage; the membrane was absorbed into the bread layer upon cooking or preparation at temperatures exceeding 70° C. Alternatively, the membrane could be formed directly on a food surface when fatty acids were omitted from the composition of the base polymer layer (3).

Greener, et al. (Greener, I K and Fennema, O., "Evaluation of Edible, Bilayer Films for Use as Moisture Barriers for Food," *J. Food Science*, 1989, 54, 1400–1406) showed that addition of a beeswax lamina in a second step was a major improvement over prior polymer-fatty acid membranes. Water vapor transfer measured at 97% relative humidity was reduced four-fold where the lipid layer of film was positioned towards the high relative humidity side of a test apparatus. Investigation of resistance to oxygen transfer of these laminated bilayer films by Greener, et al. showed that beeswax membranes provided gas barrier comparable to commercial packaging materials such as mylar and cellophane (5).

Nisperos-Carriedo, et al. (Nisperos-Carriedo, M O et al., "Changes in Volatile Flavor Components of Pineapple Orange Juice as Influenced by the Application of Lipid and Composite Films," *J. Agric. Good Chem.* 1990, 38, 1382–1387) studied retardation of spoilage in oranges by applying surface wax-based coatings. Membranes formed by brushing various mixtures of sucrose esters of fatty acids, carboxymethyl cellulose sodium salt, diglycerides, beeswax and propylene glycol esters of fatty acids showed increased in components, such as acetaldehyde, methyl butyrate, and ethyl butyrate, which are major contributors to fruity topnotes of orange flavor. Changes in these components probably resulted from altered metabolic pathways as affected by permeability of the coatings to carbon dioxide and oxygen although the authors made no effort to control transfer of these gasses.

SUMMARY

Broadly, one aspect of the present invention pertains to a synthetic integral composite membrane coated upon a substrate, a device, or a support layer by deposition from a one-phase composition, specially constituted casting, or membrane fabrication solution containing a water-insoluble polymer, a water-insoluble wax and a solvent with addition of optional additives.

One objective of this invention is to fabricate an integral composite membrane of wax-polymer, a membrane not found in nature and which has barrier properties and can limit or retard transport of a liquid, a gas, or water vapor.

A further objective of this invention is to prepare or fabricate or cast the composite membrane on a substrate by a one-step phase inversion deposition procedure which would be convenient for industrial manufacture.

Another objective of this invention is to systematically alter wax and polymer composition of the membrane casting or fabrication composition from which a membrane is deposited so as to generate films which have predictable transmembrane transport properties for liquid, water vapor or gas.

Another objective of the present invention is to coat a starch-based biodegradable polymer substrate or support material with an appropriate integral composite membrane to control water transfer such that the substrate takes up minimal water from a food or other product on storage but remains degradable under more extreme conditions.

DETAILED DESCRIPTION

Figure 1:
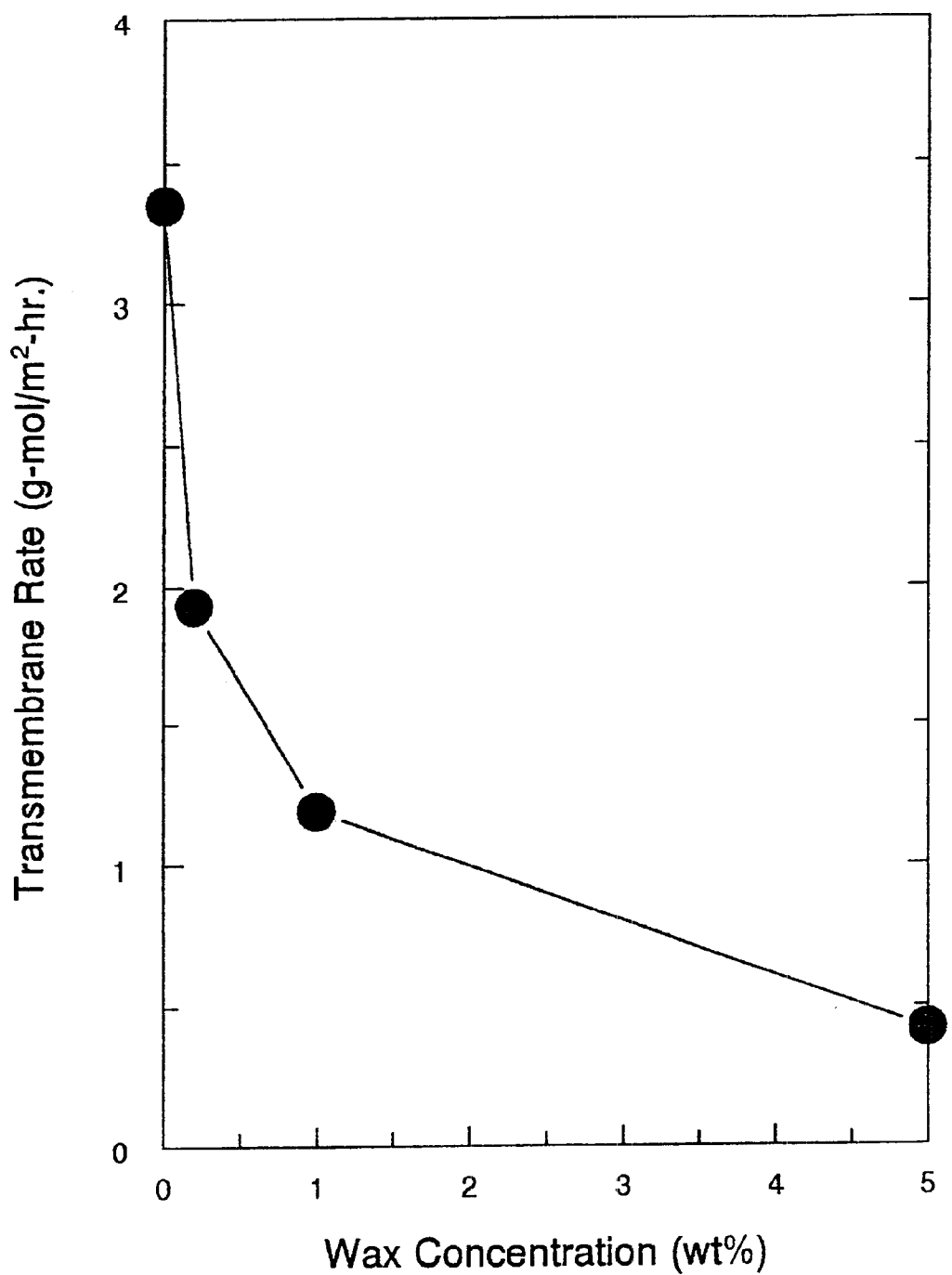
FIG. 1 shows the effect of wax concentration on water vapor transmembrane rate.

The composite membrane of the present invention can be fabricated from any water-insoluble polymer. The term "water-insoluble" as used herein means "substantially insoluble in water." The water-insoluble polymer can be a natural as well as a synthetic polymer. Examples of some natural polymers useful for this invention are cellulose acetate butyrate (Albis Corporation B900-13H and B900-20H), cellulose acetate propionate (Albis Corporation, 375E-400000-12), cellulose acetate (Aldrich Chemical Company, Inc., $M_n$=30,000) and ethyl cellulose (Dow Chemical Company, $M_w$=65,000). Examples of some synthetic polymers which can be used to prepare the composite membrane of this invention are polysulfone (Aldrich Chemical Company, Inc., $M_w$=67,000) and polyacrylonitrile-co-butadiene-co-styrene (Aldrich Chemical Company, Inc., Melt index 6–8). The invention is workable when polymer is dissolved in solvent to form a composition for membrane casting or fabrication at a concentration of from about 3 to about 50 percent by weight; polymer concentration of from about 5 to about 30 percent by weight is preferred, however. Most preferably, the polymer concentration in a composite membrane fabrication solution is between about 8 and about 25 percent by weight. Unless otherwise stated, the percent in this invention is based on the final weight of the composition.

The water-insoluble wax component of a composite membrane may be either a naturally occurring or a synthetic substance so long as the melting point of the chosen wax is between about 35° and about 150° C., for a workable embodiment of the invention or from about 45° to about 120° C. preferred. More preferably, from about 50° to about 80° C. The term wax for purposes of this invention is a collective designation for members of a group of synthetic or naturally occurring substances defined by possession of unusual sensitivity of physical properties to temperature changes as proposed by the Deutche Gessellschaft für Fettwissenschaft in 1975. Waxes so defined could have any one or more of the following attributes: (1) 20° C. (68° F.) kneadable to brittle hard consistency; (2) macro to microcrystalline and translucent to opaque but not glass-like; (3) melting above 40° C. (104° F.) without decomposition; (4) relatively low viscosity slightly above the melting point; (5) consistency and solubility are strongly dependent on temperature; and (6) capable of being polished under slight pressure.

Examples of naturally occurring wax components include animal wax such as commercial beeswax (Aldrich Chemical Company, Inc.), which is principally a complex mixture of long chain fatty acid esters, up to $C_{36}$, also containing some hydroxy acids, as well as carnauba wax (Aldrich Chemical Company, Inc.) consisting essentially of esters of hydroxylated and unsaturated fatty acids and candelilla wax (Aldrich Chemical Company, Inc.) which is mainly hentriacontane. Examples of synthetic waxes which can be used to make this invention include Callista® 158 (Shell Oil Products Company), Shellwax® 200 and Shellwax® 300 (Shell Oil Products Company). Wax concentration in the composition for membrane casting or fabrication can be within a working range of from about 0.001 to about weight percent but a preferred range of wax concentration is from about 0.1 to about 10 percent wax by weight. Most preferably, the wax concentration ranges from about 0.2 to about 5 percent by weight.

Solvents suitable for the present invention include polar organic liquids such as dimethylformamide, dimetylacetamide, and ethanol; less polar organic solvents such as acetone, butanone, and chloroform; non-polar organic solvents such as benzene and toluene. Inorganic acid and organic acid, such as acetic acid and phosphoric acid, can also be used so long as they meet certain general solvent requirements for this invention. These are:

1. Polymer, wax and optional additives must be completely soluble in the solvent at ambient or elevated temperature below the solvent boiling point. Preferred solvent boiling point is between about 58° C. and about 120° C., although between about 35° C. and about 155° C. is workable. Solvent boiling point should be higher than melting point of the chosen wax. More preferably, the boiling point of the solvent is from about 65° C. to about 85° C.
2. The wax-polymer solution is thermodynamically stable as a one-phase system at solution temperature, no phase separation, precipitation, and/or sedimentation after dissolution of polymer, wax, and optional additives.
3. Wax, polymer and optional additives are chemically stable in solvent at elevated temperature and do not react with each other.
4. The solvent must be completely removable from wax-polymer composite membrane by evaporation, water washing, leaching or other means after membrane formation.

The concentration of the solvent in the composition or membrane fabrication solution may vary and depends on the material properties and membrane fabrication conditions, such as polymer molecular structure and molecular weight, solubility parameter of solvent, concentration of wax and/or additives, and solution temperature. In general, to form useful integral composite wax-polymer membranes, the preferred solvent concentration is between about 70 to about 95 percent by weight of the fabrication solution, although from about 50 to about 97 percent by weight can be used. More preferably, the solvent concentration is from about 80 to about 90 percent by weight of the fabrication solution.

Optional additives to the composition or membrane fabrication solution have the purpose of stabilization and promote formation of a uniform wax-polymer-solvent one phase system. In this invention optional additives include long chain (>12 C) organic acids, alcohols; and paraffin, such as palmitic acid and stearic acid; hexadecanol and stearyl alcohol, hexadecane and octadecane, etc. One or more of these may be present at a concentration of from about 0.01% to about 10.0% by weight, but a preferred concentration range is from about 0.05% to about 5.0% by weight. More preferably, the concentration range is from about 0.1 to about 3% by weight.

The membrane of this invention is formed or cast by deposition or phase separation from a solution of all the component materials including polymer, water-insoluble wax and optional ingredients in a one-phase system with solvent by means of a phase inversion technique. The term phase inversion refers in general to a process wherein a solute dissolved in a solvent to form a single phase is removed from the solution or precipitated to form a two-phase mixture by a maneuver which alters solvent characteristics of the solvent; this is commonly accomplished by addition of miscible non-solvent either directly or from the vapor phase, by controlled evaporation of volatile solvent at a temperature above that required to dissolve solute, or by cooling. With progressive addition of non-solvent, and/on evaporation of solvent, a two-phase system is formed containing solute at high concentration in the solid phase. Familiar laboratory examples of such processes are precipitation, crystallization, "salting-out" of soluble proteins by ammonium sulfate and serum albumin preparation by alcohol precipitation.

One general procedure for fabrication of membranes of this invention by phase inversion includes the following steps:

1. A membrane casting solution also referred to here as the "composition," or fabrication solution or fabrication mother liquor is first prepared by dissolving with stirring a polymer, the chosen wax and optional additives in a solvent maintained at an appropriate temperature below its boiling point to obtain a stable single phase mixture or solution in which the wax, polymer and any optional additives have dissolved. The workable range of solution temperature is from about 25° to about 150° C., but the preferred range is from about 40° to about 120° C. depending upon the chosen ingredients. More preferably, the solution temperature ranges from about 60° C. to about 85° C. Solution heating temperature should be below solvent boiling point. The time for heating the solution can vary from about 1 minute to about 20 hours, preferably from about 5 minutes to about 5 hours, and more preferably from about 15 minutes to about 1 hour.
2. The solution is held statically without stirring for a period of time, for example, about 8 hours, at ambient or elevated temperature to remove air bubbles and to ensure that no phase separation, gelation, or precipitation occurs.
3. The polymer solution from the preceding step is then applied or cast on a substrate or a support layer, such as a glass plate, a non-woven fabric or another polymer layer, such as starch substrate, at a thickness of from about 0.3 mm to about 0.6 mm.
4. Among others, the phase inversion technique consists of solvent evaporation, coagulant precipitation or addition of a non-solvent to deposit or precipitate the membrane solid phase from solution liquid phase while the solution is held below its boiling point. This technique is used to solidify the cast film on the substrate. In the case of solvent evaporation, depending on the solvent used, the solvent is heated to between about 30° C. and about 150° C., preferably between about 45° C. and about 90° C., and more preferably from about 60° C. to about 80° C. The time required again depends on the solvent used. It could vary from about almost instantaneous to about 20 hours. Preferably from about half a minute to about 30 minutes, and more preferably from about 1 minute to about 5 minutes.

Where a coagulant precipitation method is used, cast films are immersed in a non-solvent bath, usually water, for 5–60 minutes at a temperature between boiling and freezing points to precipitate insoluble polymer. The preferred coagulation bath temperature ranges from about 0° C. to about 60° C. and more preferably ranges from about 15° C. to about 25° C. The coagulation bath immersion time can vary from about 0.5 minutes to about 20 hours, but preferably from about 5 minutes to about 1 hour, and even more preferably from about 15 minutes to about 30 minutes. Final removal of solvent traces is effected by water washing followed by drying in warm air.

A final curing step after solvent removal is to heat the new membrane at a temperature just above melting point of the chosen wax to stabilize the integral composite membrane structure. This membrane post-heating temperature could range from about 35° C. to about 155° C., preferably from about 55° C. to about 95° C., and more preferably from about 65° C. to about 80° C. The membrane post-heating time can vary from about 0.1 minute to about 10 hours, preferably from about 1 minute to about 30 minutes, and more preferably from about 2 minutes to about 15 minutes.

In this invention a polymer solution may be applied to substrate or support layer in many ways, for example by dipping, spraying or brushing on the surface. Polymer solution extruded by a spinning jet can form integral composite wax-polymer hollow fiber membranes.

Disposable biodegradable containers, packages, tableware and wrapping materials for the food industry could be processed or recycled to replace current options which generate large quantities of inert waste. Starch is a naturally-occurring hydrophilic polymer of hexose subunits which can be formed into rigid shapes in a dry state but is converted into a jelly-like enzymatically degradable mass by hot water. An easily applied surface modification of starch-based materials with coatings possessing predictably favorable water transfer inhibition properties could be used to produce these biodegradable articles.

Examples of useable substrate include starch and protein based food package materials; natural and synthetic fabrics such as silk and non-woven fabrics, paper products such as cardboard, different woody surface, synthetic polymer products, metal substances, etc. Selective combination of coating solution composition provides assurance for this coating technology to meet different application requirements.

Integral composite wax-polymer membranes posses properties which limit transmembrane transfer rates for oxygen, nitrogen, water vapor and other gasses. It is an important property of the membranes of this invention that transfer rates for these gasses and others varies as a function of wax concentration in membrane casting or fabrication solution over the working range of wax concentration 0.001 to 20% by weight. The transmembrane transfer control feature of wax-polymer membranes makes them useful for surface modification of biodegradable products, and for controlled release and gas separation applications.

The following examples are provided to further illustrate this invention and the manner in which it may be carried out. It will be understood, however, that the specific details given in the examples have been chosen for purposes of illustration only and are not to be construed as limiting the invention, In the examples, unless otherwise indicated, all parts and percentages are by weight and all temperatures are in degrees Celsius.

EXAMPLE 1

One embodiment of the present invention is an integral composite beeswax-cellulose acetate butyrate (CAB) membrane. Cellulose acetate butyrate, 12% by weight, beeswax 0.2% to 5.0% by weight and solvent 83–87.8% by weight, where solvent was acetone/butanone in weight ratio of 1/4, was heated to 66° C. for 30 minutes with occasional stirring to form a true solution with one phase. Standing at 65° C. overnight removed air bubbles. After membrane casting on glass plate at 0.4±0.1 mm thickness and drying for 5 minutes at 67°±2° C., new membranes were peeled off, cooled by blowing in fresh air at room temperature and reheated at 67°±2° C. for 5 minutes. The product was a dense membrane 60±$\mu$m thick. Scanning electron microscopy showed an asymmetric structure having a thin wax layer on top of membrane matrix, with some wax penetrating into polymer matrix.

Figure 2:
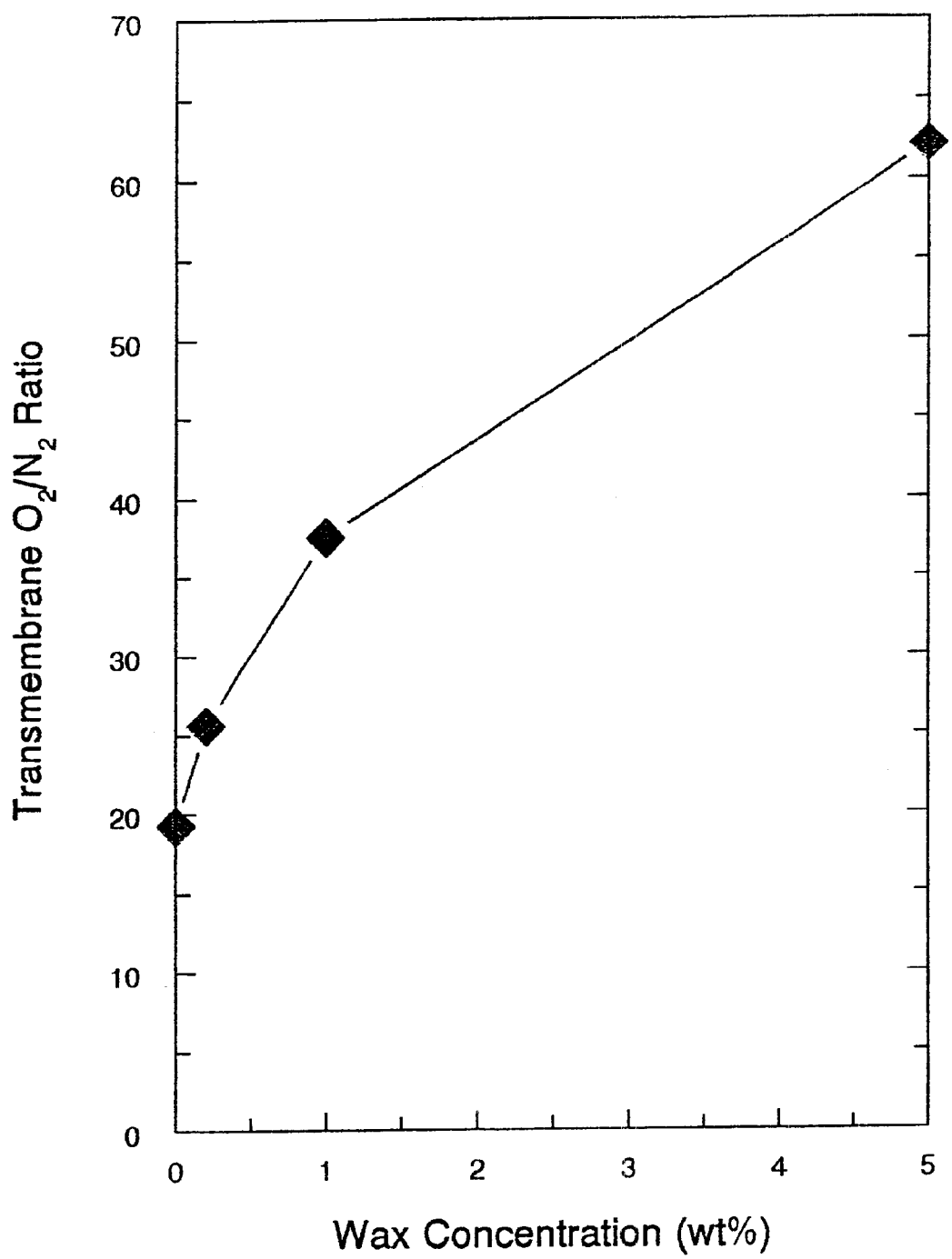
FIG. 2 shows the effect of wax concentration on transmembrane oxygen/nitrogen ratio.

Cellulose acetate butyrate membranes are permeable to nitrogen, oxygen and water in a vapor phase and transmembrane transport is controlled by wax concentration in membrane fabrication solution as shown in FIGS. 1 and 2. The permeability, or transmembrane transport, of composite wax-polymer membranes towards a liquid or a gas, such as water vapor, liquid water, oxygen and nitrogen gases, can be controlled by changing the composition of the membrane fabrication solutions. FIGS. 1 and 2 illustrate this controlled membrane permeability. For example, by increasing wax concentration in the fabrication solution from 0 to 5 wt %, permeability of the membrane towards water vapor was reduced from 3.37 g-mol/m$^2$-hr. To 0.42 g-mol/m$^2$-hr. Water vapor transmembrane rate was tested at 37.8° C., and the humidity of the feed was 100% relative humidity, the permeate had 0% relative humidity (FIG. 1). Gas transmission rates were measured at 23° C. and gas pressure differential 760 mm Hg across the membrane using the Mocon Ox-Tran 2/20 system with method ASTM F-1307 and the Mocon Multi-Tran 400 system for nitrogen using membranes with 1 cm$^2$ and 5 cm$^2$ areas, respectively with the lipid layer of the membrane oriented to the high pressure side. A transmembrane $O_2/N_2$ ratio was calculated from results of two or more experiments (FIG. 2).

FIG. 1 shows an exponential decline of water vapor transmission with wax concentration with half of the total effect obtained at beeswax concentration 0.5% by weight in the fabrication or casting solution. FIG. 2 shows progressive facilitation of oxygen transport relative to nitrogen by increasing beeswax concentration. Results show that membranes of this invention have predictable transmembrane transport characteristics which vary with wax concentration in the parent membrane fabrication solutions.

EXAMPLE 2

Another embodiment of this invention is to control surface modification of a starch-based substrate to limit water transport by variation of wax concentration in order to create a biodegradable food package. A membrane fabrication or casting solution of 2% by weight beeswax and 10% by weight polymer in 50% (weight) acetone/butanone (88% by weight) was prepared using five polymers. These were: (1) cellulose acetate butyrate (Albis Corp., B900-13H); (2) cellulose acetate butyrate (Albis Corp., B900-20H); (3) cellulose acetate propionate (Albis Corp., 3 75E-400000-12); (4) cellulose acetate (Aldrich Chemical Company, Inc., $M_n$ ca. 30,000); and (5) ethylcellulose (Dow Chemical Company, $M_w$ 65,000). Both polymer and wax dissolved completely after about 30 minutes occasional stirring at 65±2° C., to give clear uniform somewhat viscous mixtures. Storage at 65±2° C. overnight removed air bubbles introduced during solution preparation. Solutions were coated or applied onto starch-based biodegradable plates, bowls and hamburger containers by spraying, brushing or dipping and coated items dried at 63±2° C. with hot air follow for about 5 minutes to evaporate solvent and solidify wax-polymer membranes. The dried coated items further cooled at about 23±2° C. for 5 minutes in room air to complete removal of organic solvent. The post-heating step at an oven temperature of 65±2° C. for 5 minutes completed the membrane deposition or fabrication process and resulted in a product coated with an integral composite wax-polymer membrane 20 to 150 $\mu$m thick on starch-based substrate.

Figure 3:
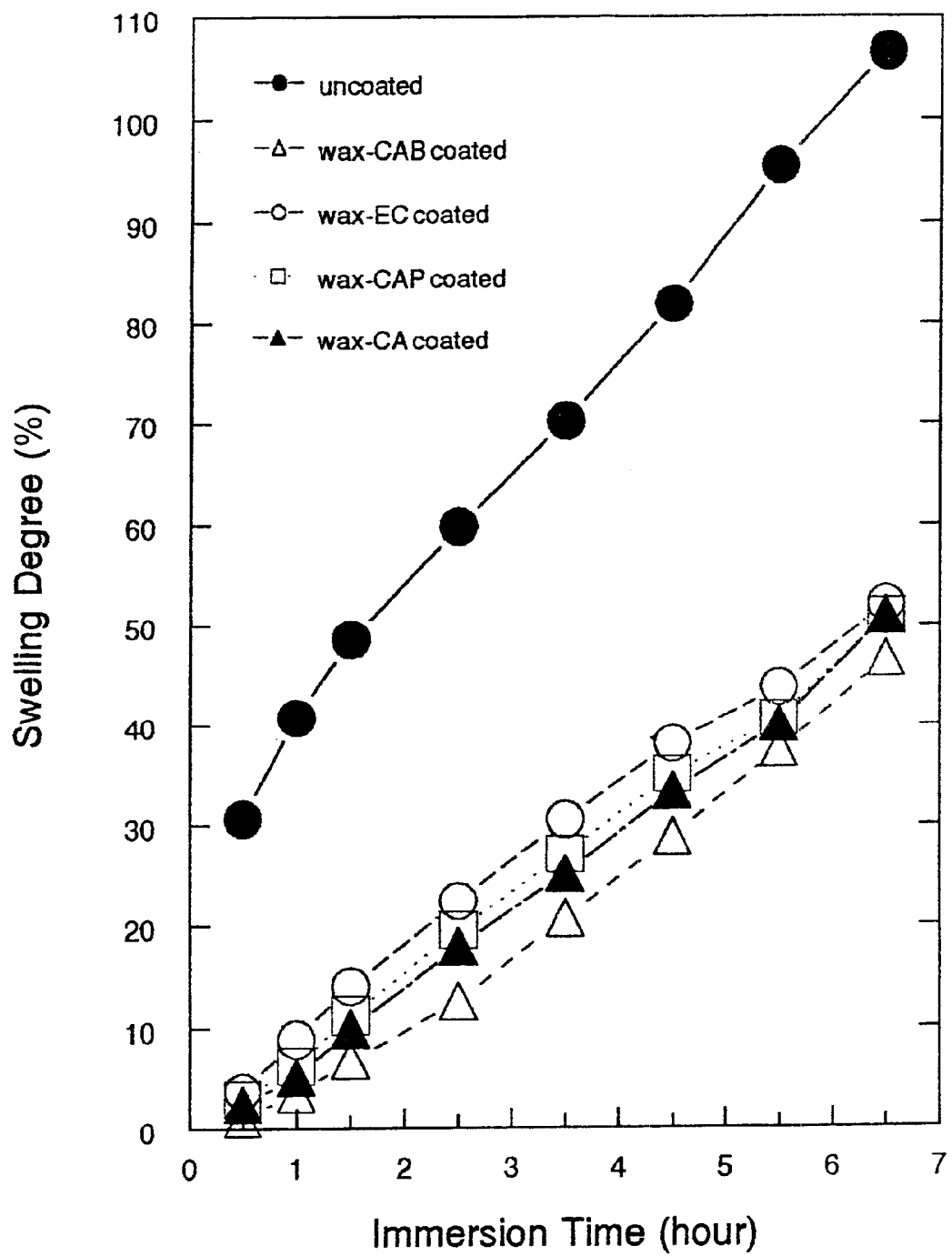
FIG. 3 shows water immersion time vs. swelling degree for coated and un-coated starch-based product.

Membrane coating results in decreased water swelling or imbition by coated items immersed in water at room temperature for extended time. Initial weight and weight after immersion for time periods up to 7 hours for coated articles were measured with water uptake expressed as a ratio of weight gain to original weight converted to percent. FIG. 3 shows that coating from 2% beeswax solution retards water uptake of starch-based containers by about 50% over time. Starch-based biodegradable natural polymer products which resisted water immersion from 3 hours to 7 days were fabricated by changing wax concentration in the membrane casting solution over the range 0.2 to 8 weight percent, water uptake measured as above at 24° C. is 25%.

EXAMPLE 3

Integral composite wax-polymer membranes was prepared from poly(acrylonitrile-co-butadiene-co-styrene) (PBS) and a variety of waxes and optional additives using a water-coagulation modification of phase-inversion methodology. PBS [Aldrich Chemical Company, Inc., melt index (230° C./3.8 kg, ASTM D 1238) 6–8 grams per 10 minutes] at 22 weight %, Callista® 158 synthetic wax (Shell Oil Products Company, melting point 77° C.) at 0.7 to 2.5 weight % and stearic acid (Aldrich Chemical Company, Inc., melting point 67–69%) were dissolved in N,N-dimethylacetamide 70.0 to 77.3 weight % with magnetic stirring at 80±3° C. for about 0.5 hour. The solutions were then kept at same temperature for about 8 hours to eliminate bubbles. Polymer solutions cast on pre-heated glass plates at a thickness of 0.4±0.1 mm were allowed to evaporate for 3 minutes at 80±3° C. and immersed in water at room temperature for 30 minutes to form membranes. Product membranes were washed in fresh water and 15 weight percent glycerol-water solution, air dried and reheated at 80°±2° C. for 5 minutes. Scanning electron microscopy revealed typical membranes of this invention possessing a thin wax layer on top of the membrane, and a thin polymer dense layer and a thick porous support layer.

EXAMPLE 4

A composite wax-polymer membrane that enhances oxygen/nitrogen selectively was prepared by mixing 5 wt % beeswax, 12 wt % cellulose acetate butyrate, 0.8 wt % 1-octadecanol, and 82.2 wt % butanone. The solution was heated to about 70° C. for 0.5 hour. A uniform solution was formed. The solution is kept at 70° C. overnight. The solution was then cast on pre-heated glass plate (68° C.) with thickness of 0.4 mm. Cast membrane was dried at 70° C. for 5 minutes. Cooled the membrane to room temperature, and membrane was peeled off the glass plate. Re-heated the membrane at 68° C. for 5 minutes. An integral composite membrane with very thin wax layer (approximately 0.3 $\mu$m)

on top of the membrane was formed. This membrane reduces oxygen gas transmembrane rate about 25% comparing with non-wax containing cellulose acetate butyrate membranes prepared at same conditions. This membrane also reduces nitrogen gas transmembrane rate about 62%. Therefore, the composite wax-CAB membranes enhance the separation selectivity of oxygen and nitrogen gases.

EXAMPLE 5

A composite wax-polymer membrane coating for disposable dish products was prepared by mixing 3 wt % beeswax and 9 wt % cellulose acetate butyrate with 88 wt % acetone/butanone mixture (ratio of acetone/butanone is 1/4). The mixture was heated to 66° C. for 15 minutes with stirring and an uniform solution was formed. The solution was kept at 66° C. for about 3 hours to remove air bubbles. Brushing method was used to apply the solution on the surface of starch based disposable dishes. Thickness of non-dried coating layer was about 0.3 mm. The coated items were heated at 67° C. for 3 minutes. Air cooled the items. Re-heated the items at 67° C. for another 2 minutes. The surface of the dishes becomes hydrophobic and water barrier after the coating.

What is claimed is:

1. A device prepared by:
   a. providing a substrate;
   b. preparing a composite membrane fabrication solution by means of phase inversion technique, wherein the composite membrane fabrication solution is non-aqueous, and wherein the composite membrane fabrication solution comprises, based on the final weight of the solution:
      i. a water-insoluble polymer, in an amount of from about 3% to about 50%, and
      ii. a water-insoluble wax, in an amount of from about 0.001% to about 20%, in a solvent; and
   c. coating the substrate with the composite membrane fabrication solution to form a substrate coated with a composite membrane, wherein the composite membrane allows controlled permeability of water vapor.

2. The device of claim 1, wherein the substrate comprises a starch-based polymer product.

3. The device of claim 1, wherein the substrate comprises a non-woven fabric.

4. The device of claim 1, wherein the composite membrane fabrication solution further comprises an ingredient selected from the group consisting of stearic acid, palmitic acid, and stearyl alcohol, in an amount of from about 0.01% to about 10%.

5. The device of claim 1, wherein the water-insoluble polymer is in an amount of from about 5% to 30%.

6. The device of claim 1, wherein the water-insoluble wax is in an amount of from about 0.1% to 10%.

7. The device of claim 1, wherein the water-insoluble polymer is selected from the group consisting of cellulose acetate butyrate, cellulose acetate propionate, cellulose acetate and ethylcellulose.

8. The device of claim 1, wherein the water-insoluble polymer is selected from the group consisting of polysulfone and polyacrylonitrile-co-butadiene-co-styrene.

9. The device of claim 1, wherein the water-insoluble wax is selected from the group consisting of beeswax, carnauba wax and cadelilla wax.

10. The device of claim 1, wherein the solvent is selected from the group consisting of dimethylformamide, dimethylacetamide and ethanol.

11. The device of claim 1, wherein the solvent is selected from the group consisting of acetone, butanone, chloroform, benzene, toluene and acetic acid.

12. device of claim 1, wherein the solvent is phosphoric acid.

* * * * *